Sept. 11, 1962   R. W. BLAIR ET AL   3,053,593
POLYTETRAFLUOROETHYLENE BUSHINGS AND
WASHERS AND METHOD OF FORMING SAME
Filed May 27, 1959   2 Sheets-Sheet 1
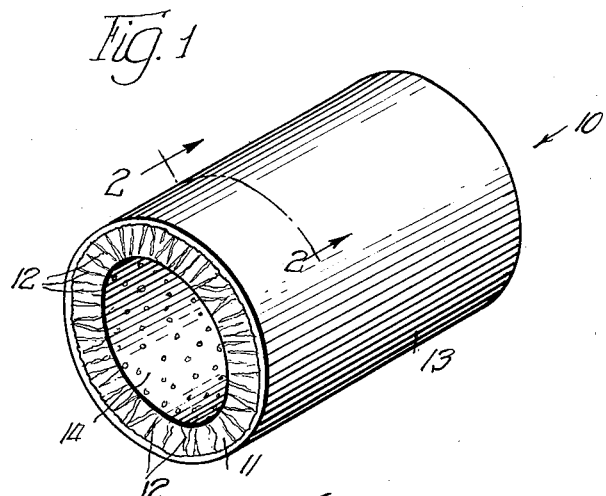
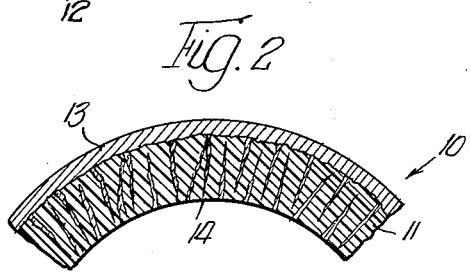
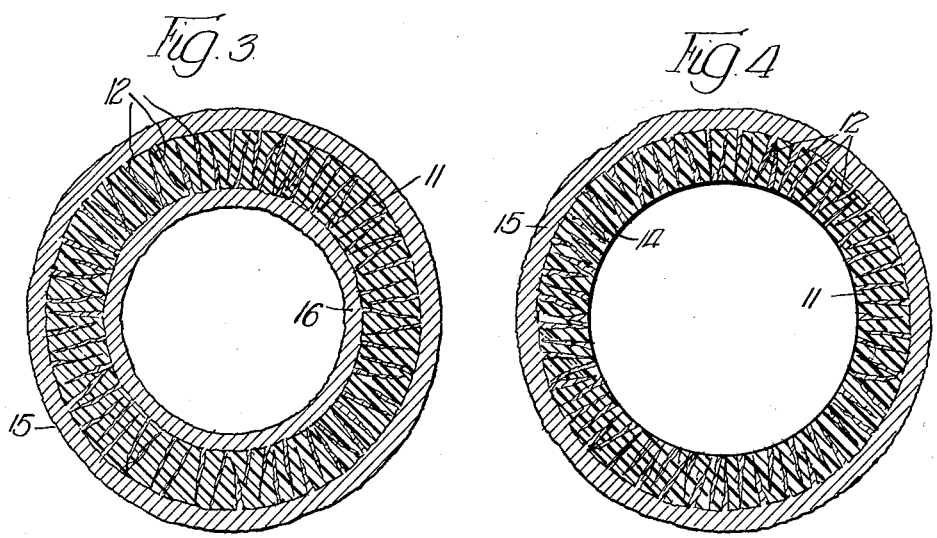
INVENTORS.
Richard W. Blair,
Donald L. Johnson,
BY James P. Morley,
Cromwell, Greist & Warden
Attys.

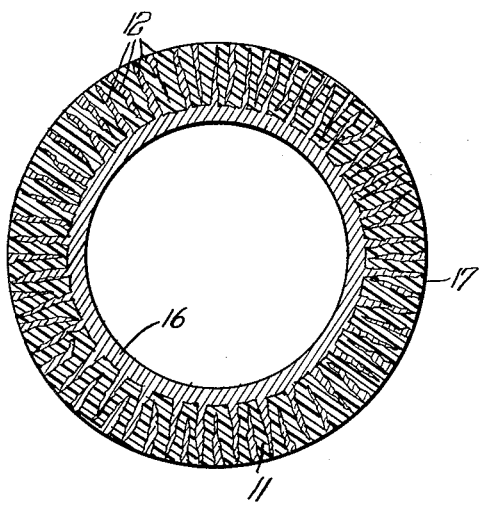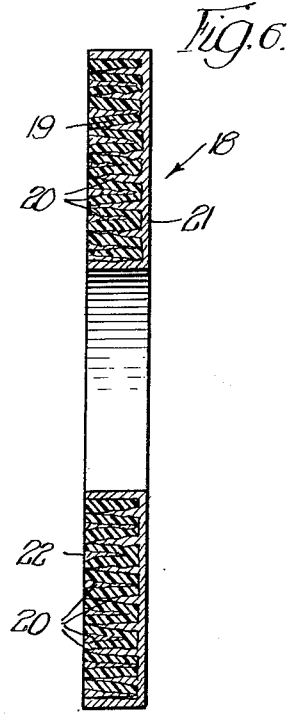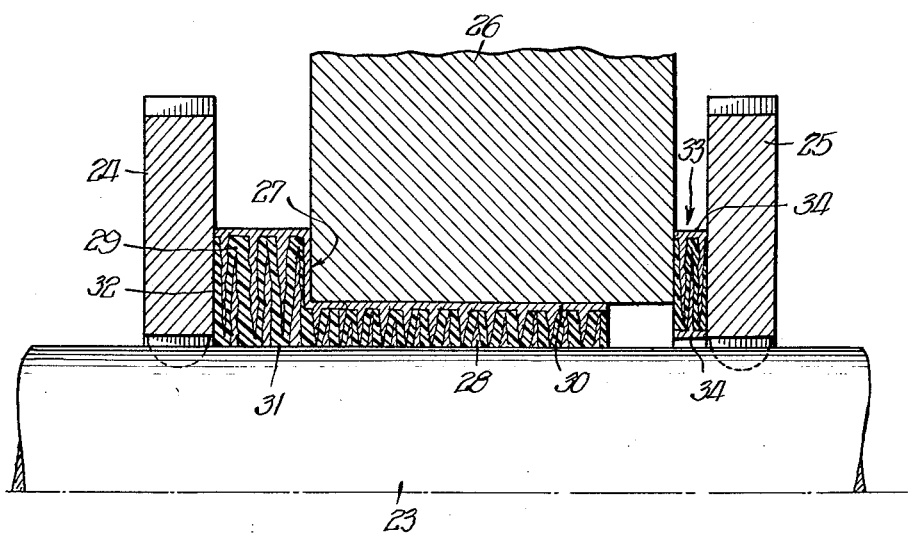

United States Patent Office
3,053,593
Patented Sept. 11, 1962

3,053,593
POLYTETRAFLUOROETHYLENE BUSHINGS AND WASHERS AND METHOD OF FORMING SAME
Richard W. Blair, Arlington Heights, Donald L. Johnson, Mount Prospect, and James P. Morley, Chicago, Ill., assignors to Chicago Rawhide Manufacturing Company, Chicago, Ill., a corporation of Illinois
Filed May 27, 1959, Ser. No. 816,132
19 Claims. (Cl. 308—238)

The present invention relates to the provision of new and improved forms of annular resinous material bushing and washer elements adapted for installational use with rotating and/or reciprocating shafts. More specifically, the invention is directed to a new and improved metal impregnated polytetrafluoroethylene bushings and washers including various methods of forming the same, the impregnating metallic material improving the overall strength of the polytetrafluoroethylene elements while imparting thereto means for the efficient conduction of heat from the bearing surfaces thereof to prolong the effective and useful life of the elements.

With the advent of sintered polytetrafluoroethylene material, the somewhat unique properties of this material have been of particular interest in the field pertaining to shaft bearings and bushings. Sintered polytetrafluoroethylene is a relatively hard plastic, long wearing material and in many applications it exhibits very desirable chemical inertness. Still further, and of particular interest in shaft bearing applications, the sintered material exhibits self-lubricating properties which permit efficient utilization of bearings, bushings or washers formed therefrom in non-lubricated shaft areas in many shaft installations. Consequently, the use of sintered polytetrafluoroethylene in bearing, bushing and washer fabrication is becoming more widespread and is under continuing investigation.

In applications of the type described, it has been considered desirable to provide some means whereby frictional heat developed at the bearing surface of the resinous element may be readily conducted therefrom normally radially outwardly for dissipation in the surrounding areas of the bearing housing. Bearing element designs have been proposed wherein polytetrafluoroethylene is combined in some manner with heat conductive metallic material to take advantage of the desirable properties of the resinous material and yet protect the same from excessive heat damage by efficient utilization of the conductivity of the combined metallic material. The more successful designs have proven rather expensive not only from the standpoint of the initial cost of the material utilized in the same, but also from the standpoint of cost of fabrication. In several instances the fabricating procedures practiced are rather complicated and elaborate thus materially adding to the overall cost of fabrication.

It is an object of the present invention to provide a new and improved resinous material bushing or washer type element which is impregnated with metallic material to improve the strength and operational characteristics of the same.

A further object is to provide new and improved methods of forming the metallic material impregnated bushing and washer type element of the present invention, these methods being devised for the purpose of maintaining the cost of fabrication at a minimum while providing for efficient and controlled metal impregnation of the element.

Another object is to provide a specially fabricated bushing or washer type element formed from metal impregnated polytetrafluoroethylene, at least one surface of said element having a deposited metal covering thereon formed from the impregnating metal during impregnation of said polytetrafluoroethylene.

Other objects not specifically set forth will become apparent from the following detailed description made in conjunction with the drawings wherein:

FIG. 1 illustrates in perspective a new and improved type of bushing formed in accordance with the principles of the present invention;

FIG. 2 is an enlarged fragmentary section of the bushing taken generally along line 2—2 in FIG. 1;

FIG. 3 is a somewhat schematic cross section of the bushing at a stage during the fabrication thereof immediately following completion of the metal impregnation of the polytetrafluoroethylene base material thereof;

FIG. 4 is a view similar to FIG. 3 illustrating the bushing at a subsequent stage in the fabrication thereof following removal from the inner bearing surface thereof of the metallic material coating-like cover;

FIG. 5 is another view similar to FIG. 3 illustrating a variation in the finishing operation;

FIG. 6 is a vertical section of one form of washer type element fabricated in conformance with the principles of the present invention; and FIG. 7 is a top half fragmentary section of an installation including therein still other forms of bushing and washer type elements prepared in practicing the present invention.

Polytetrafluoroethylene is available in powdered form and in fabricating particles of variable shapes therefrom, powdered material is pre-shaped by compacting in dies, presses or other suitable equipment under pressures which may range from 2,000 to 15,000 p.s.i. or more. With the shaping and compaction of the powdered material, the preform may be readily removed from the shaping press or die and transferred to high temperature processing equipment wherein the preform is sintered at temperatures in the neighborhood of about 700° F. The sintering of the compacted powder results in the formation of a relatively hard article having smooth surfaces which are, in effect, self-lubricating due to the nature of the material. These surfaces are also virtually inert to a degree that particularly adapts the sintered material for use as a bearing surface in conjunction with rotating and/or reciprocating shafts.

As particularly illustrated in FIGS. 1 and 2, a bushing 10 of the present invention is formed from an annular sintered polytetrafluoroethylene sleeve portion 11 which is impregnated with a suitable metallic material 12. An outer metallic material cover or shell 13 is integrally formed with at least the adjacent portions of the impregnating metallic material 12. The inner bearing surface 14 of the bushing 10 consists of a virtually continuous polytetrafluoroethylene facing for shaft engagement with interspersed, rather minute metallic particles 12 exposed therein or buried immediately below the surface.

The polytetrafluoroethylene sleeve 11 is preferably porous throughout providing for a series of interconnected passages or voids therein in which the metallic material 12 is deposited. The pores or voids are formed in the resinous sleeve 11 during the sintering thereof by the vaporization of suitable material which is initially admixed with the powdered polytetrafluoroethylene prior to the preforming or shape-compacting thereof.

In preparing the porous polytetrafluoroethylene, any suitable vaporizable material which can be mixed and compacted with powdered polytetrafluoroethylene may be used. Preferably, fibrous resins which volatilize at a temperature substantially below the sintering temperature of polytetrafluoroethylene should be used. Materials capable of structurally withstanding molding pressures while being vaporizable during sintering of the polytetrafluoroethylene include the series of polymerized acrylate or methacrylate resins commercially available under the trade designation "Lucite," a product of E. I. du Pont de Nemours Company of Wilmington, Delaware. In addition to these resins, polystyrene resins such as "Bakelite" (available from Union Carbide and Carbon Corporation of New York, New York) and "Styron" (made by Dow Chemical Company of Midland, Michigan) also exhibit the requite properties for use in forming a porous sintered polytetrafluoroethylene bushing. As described above, the vaporizable resin is blended with the powdered polytetrafluoroethylene with the mixture being introduced into a suitable die or mold. The die cavity is designed to control the final shape of the compressed article which is formed from the blended powders by the application of suitable pressure. During heating of the preform to sinter the same, the vaporizable material is removed from the polytetrafluoroethylene to impart thereto an adequate porosity. By way of example, the preform may be held at a temperature of about 400° F. until all of the vaporizable material is removed therefrom, following which the temperature is raised to a sintering temperature of approximately 700° F.

The extent of porosity in the sintered polytetrafluoroethylene bushing sleeve 11 is controlled by the amount of vaporizable material admixed with the virgin polytetrafluoroethylene in the preforming stage. By way of example, if 25% porosity is desired, approximately 25% of the original powder and fibrous mixture constitutes the vaporizable material. Preferably, the sleeve 11 will be made porous throughout, although, for purposes of metallic material impregnation, just the inner portion of the sleeve may be made porous.

Following the forming of the porous sleeve 11, the same is then subjected to metallic material impregnation to deposit in the pores thereof adequate metallic material for the purpose of supplying means by which frictional heat is conducted away from the inner bearing surface 14. The depositing of the metallic material may be carried out following several different procedures. Generally speaking, it has been found that the most effective procedure includes the subjecting of the porous sleeve 11 to differential pressure conditions in the presence of fluid metallic material.

One of the preferred procedures to obtain metal impregnation includes the subjecting of the porous sleeve 11 to vacuum conditions in the presence of molten metallic material. This can be accomplished by introducing the porous sleeve 11 into a retort in which metal in molten condition is maintained. The sleeve 11 is held above the surface of the molten metal and a vacuum is drawn on the retort to an extent of about 29 to 30 inches Hg. With the drawing of the vacuum, the porous sleeve 11 becomes completely immersed in the molten metal resulting in a complete covering of the surfaces of the sleeve and at least substantial surface impregnation of the metal into the pores of the sleeve. Following adequate immersion, the vacuum is quickly broken thus returning the retort to atmospheric pressure conditions which constitutes an instantaneous pressurization of the metal coated sleeve 11. This pressurization results in complete impregnation of the pores of the sleeve with the metal material. In other words, fluidity of the metal is not completely overcome upon pressurization of the sleeve before the metal has thoroughly impregnated the sleeve. Following impregnation completion, the coated sleeve is removed from the retort and cooled for metal solidification.

The part issuing from the retort is in the condition schematically illustrated in FIG. 3. This part includes the inner porous polytetrafluoroethylene sleeve 11 thoroughly impregnated with metal particles 12, provided with a rough outer surface metallic coating 15 and a rough inner surface metallic coating 16. The coatings 15 and 16 are integrally joined with the adjacent metal root-like streams extending into the pores of the sleeve 11 and are thus firmly attached to the sleeve 11. To condition the article of FIG. 3 for use, the inner metallic coating 16 is removed by suitable reaming or machining to form the inner bearing surface 14 described above in connection with the finished bushing 10 of FIGS. 1 and 2. The condition of the bushing following this step is illustrated in FIG. 4. The outer coating 15 is preferably machined, finished and sized in any suitable manner to define the finished shell 13 illustrated in FIGS. 1 and 2. The procedure described is uncomplicated and economical as can be readily appreciated. The bushing formed in the single step of metal impregnation is complete in that the polytetrafluoroethylene sleeve 11 is not only impregnated with heat conductive metal but is also externally coated with metal to provide improved strength as well as a complete structure requiring little finishing operations prior to actual shaft housing installation.

Another method of forming the metal impregnated polytetrafluoroethylene bushing includes the placing of the porous sleeve 11 in cooled condition following sintering in a vapor stream of vaporized metallic material. This can also be accomplished in a retort wherein adequate vacuum is utilized to cause sufficient vaporization of the molten metallic material. The relatively low temperature of the sleeve 11 results in condensing the vaporized metal in the pores thereof and on the surfaces thereof almost immediately upon insertion of the cool sleeve into the vapor stream. In effect, the porous sleeve functions as a metallic material condensing unit with the fluid metal vapor retaining its fluidity for a sufficient length of time to completely impregnate and coat the sleeve.

Still a further method of impregnating the porous sleeve 11 with metallic material includes the placing of the porous sleeve in a die cavity followed by the introduction thereinto of molten metal. Upon the application of pressure the metal completely impregnates and coats the sleeve.

Another method of forming the bushing of the present invention includes the forming of a porous polytetrafluoroethylene tube or sleeve of substantial length which, following metal impregnation, is to be sub-divided into a plurality of bushings. The tube is placed in suitable equipment to permit the pumping of molten metal through the interior thereof under adequate pressure to force the metal outwardly through the pores of the tube resulting in impregnation and coating of the tube. Still further, suitable equipment may be used wherein the tube is subjected to a vacuum drawn externally thereof causing the molten metal flowing through the interior thereof to be drawn through the tube for impregnation and covering thereof. Following solidification of the metal in and on the tube, the same is then sub-divided to form a plurality of metal impregnated bushings. Prior to or subsequent to this operation the inner metal coating may be removed and the outer metal coating subjected to finishing treatment.

Any suitable metallic material may be used in impregnating the porous polytetrafluoroethylene sleeve 11. The metals used need not have melting points which are below the temperature at which polytetrafluoroethylene vaporizes as long as excessive vaporization does not occur. Metals such as babbitt and solder are particularly suitable. By way of example, a high tin babbitt having a melting point of about 550° F. has been used. The composition of this material increases 89% tin, 7% antimony and 4% copper. In the molten state, the impregnation procedure may be carried out at a temperature gradient ranging from 75° to 125° above the melting point of the impregnating metal.

Several important variations of the invention as described may be obtained. For example, the intermediate form of the bushing of FIG. 3 may be provided with an outer surface bearing face by removing (by machining, etc.) the outer metallic coating 15 and retaining the inner coating 16 which is useful for force-fitting mounting on a shaft and the like. This modification is shown in FIG. 5 wherein the exposed outer surface 17 constitutes the bearing face.

Washers may also be formed in the manner described as shown in FIG. 6. A floating washer 18 is formed from porous polytetrafluoroethylene 19 impregnated with metallic material 20. An integrally formed metallic covering 21 extends continuously around the outer surface, one end face, and the inner surface. A bearing face 22 of metal impregnated polytetrafluoroethylene constitutes the other end face of the washer, this face having been formed by removal of the metallic coating therefrom. It will be appreciated that any portion of the integral metallic coating 21 may also be removed depending on the type of installational use desired.

A gear installation is illustrated in FIG. 7 as including a shaft 23 (idler or driven) having spline connected thereto a pair of spaced gears 24 and 25. These gears are positioned on opposite sides of a housing 26 through which the shaft 23 is journaled by means of a shouldered bushing 27. This bushing includes an elongated sleeve portion 28 having at one end thereof in end face bearing engagement with the gear 24 an enlarged shoulder portion 29. The bushing 27 is formed from porous polytetrafluoroethylene impregnated with metallic material in the manner previously described. The integral metal coating 30 formed on all surfaces of the bushing during metal impregnation is retained on the outer surfaces of the bushing for force-fitted mounting of the bushing in the housing 26. The inner bearing face 31 has the metal coating removed therefrom and the end bearing face 32 is similarly machined for engagement with the gear 24.

The installation of FIG. 7 also includes a floating washer 33 formed in the manner described and presenting polytetrafluoroethylene bearing faces in sealing engagement with the gear 25 and adjacent end face of the housing 26. With this particular type of washer, the inner and outer surfaces have metal coatings 34 retained thereon. In comparing this washer with the washer 18 of FIG. 6, it will be appreciated that portions of the metal coating may be retained as desired. The washer 33 may also be sliced from the bushing of FIG. 3 if desired.

In improving the wear properties of the polytetrafluoroethylene bushings and washers of the present invention, the initial powdered material used may include suitable filler materials added to the virgin polytetrafluoroethylene as well as the vaporizable resinous material. By way of example, ground glass fibers, graphite and/or molybdenum sulphide may be used as filler materials. Of the virgin polytetrafluoroethylene and filler material portion of the mixture, the polytetrafluoroethylene should preferably constitute at least 50%.

Obviously certain modifications and variations of the invention as hereinbefore set forth may be made without departing from the spirit and scope thereof, and therefore only such limitations should be imposed as are indicated in the appended claims.

We claim:

1. A polytetrafluoroethylene element for use as a bearing member, said element provided with a plurality of passages and interconnected voids therein which impart substantial porosity thereto, and metallic material at least substantially filling said passages and interconnected voids for the conduction of heat through said element, said metallic material extending out of said passages and voids continuously along a surface of said element and forming a shell therefor which shell is integrally connected with the metallic material in said passages and voids throughout said element.

2. The element of claim 1 being in the form of a bushing with said shell extending along the outer surface thereof.

3. The element of claim 1 being in the form of a bushing with said shell extending along the inner surface thereof.

4. The element of claim 1 being in the form of a washer.

5. The method of forming a polytetrafluoroethylene element impregnated with metallic material for mounting on a shaft, said method comprising forming an annular polytetrafluoroethylene member having at least a relatively porous inner bearing surface, subjecting at least the inner bearing surface of said member to pore impregnating pressure conditions in the presence of fluid metallic material, and solidifying the metallic material which impregnates said member.

6. The method of forming a polytetrafluoroethylene element impregnated with metallic material for mounting on a shaft, said method comprising forming an annular polytetrafluoroethylene member having at least a relatively porous inner bearing surface, subjecting at least the inner bearing surface of said member to pore impregnating pressure conditions in the presence of fluid metallic material, solidifying the metallic material which impregnates said member, and removing the metallic material coating deposited on the bearing surface of said member.

7. The method of forming a polytetrafluoroethylene element impregnated with metallic material for mounting on a shaft, said method comprising forming a relatively porous annular polytetrafluoroethylene member, subjecting said member to differential pressure conditions in the presence of fluid metallic material, and solidifying the metallic material which impregnates said member.

8. The method of forming a polytetrafluoroethylene element impregnated with metallic material for mounting on a shaft, said method comprising forming a relatively porous annular polytetrafluoroethylene member, subjecting said member to differential pressure conditions in the presence of fluid metallic material, solidifying the metallic material which impregnates said member, removing the metallic material coating deposited on the bearing surface portion of said member, and smoothing and sizing the metallic material coating deposited on the remaining surface portions of said member.

9. The method of forming a polytetrafluoroethylene element impregnated with metallic material for mounting on a shaft, said method comprising compounding powdered polytetrafluoroethylene with pore forming vaporizable resinous material which vaporizes at a temperature below the sintering temperature of polytetrafluoroethylene, preforming said compounded materials under pressure into annular member shape, heating said member to sintering temperature during which heating said vaporizable resinous material is removed from said member resulting in the formation of pores therein, solidifying the metallic material which impregnates said members, and removing the metallic coating deposited on the bearing surface of said member.

10. The method of forming a polytetrafluoroethylene element impregnated with metallic material for mounting on a shaft, said method comprising compounding powdered polytetrafluoroethylene with filler material and pore forming vaporizable fibrous resin material which vaporizes at a temperature below the sintering temperature of polytetrafluoroethylene, preforming said compounded materials under pressure into annular member shape, heating said member to sintering temperature during which heating said vaporizable resin material is removed from said member resulting in the formation of pores therein, removing the metallic material coating deposited on the bearing surface portion of said member, and smoothing and sizing the metallic material coating deposited on the remaining surface portions of said member.

11. The method of forming a polytetrafluoroethylene element impregnated with metallic material for mounting on a shaft, said method comprising compounding powdered polytetrafluoroethylene with filler material and pore forming vaporizable resin material selected from the group consisting of acrylate, methacrylate and polystyrene resins, preforming said compounded materials under pressure into annular member shape, heating said member to sintering temperature during which heating said vaporizable resin material is removed from said member resulting in the formation of pores therein, removing the metallic material coating deposited on the bearing surface portion of said member, and smoothing and sizing the metallic material coating deposited on the remaining surface portions of said member.

12. The method of forming a polytetrafluoroethylene element impregnated with metallic material for mounting on a shaft, said method comprising forming a relatively porous annular polytetrafluoroethylene member, subjecting said member to vacuum conditions in the presence of molten metallic material providing for metallic covering and at least partial impregnation of the surfaces and pores of said member, immediately subjecting said metallic covered member to increased pressure conditions to complete pore impregnation, cooling said member, and removing the metallic covering on the bearing surface of said member.

13. The method of forming a polytetrafluoroethylene element impregnated with metallic material for mounting on a shaft, said method comprising compounding powdered polytetrafluoroethylene with pore forming vaporizable resin material which vaporizes at a temperature below the sintering temperature of polytetrafluoroethylene, preforming said compounded materials under pressure into annular member shape, heating said member to sintering temperature during which heating said vaporizable resin material is removed from said member resulting in the formation of pores therein, subjecting said member to vacuum conditions in the presence of molten metallic material providing for metallic covering and at least partial impregnation of the surfaces and pores of said member, immediately subjecting said metallic covered member to increased pressure conditions to complete pore impregnation, cooling said member, removing the metallic covering on the bearing surface portion of said member, and smoothing and sizing the metallic covering on the remaining surface portions of said member.

14. The method of forming a polytetrafluoroethylene element impregnated with metallic material for mounting on a shaft, said method comprising forming a relatively porous annular polytetrafluoroethylene member, placing said member in a vapor stream of vaporized metallic material maintained under vacuum conditions, the vaporized metallic material condensing on said member to cover and impregnate said member, and removing the metallic covering on the bearing surface of said member.

15. The method of forming a polytetrafluoroethylene element impregnated with metallic material for mounting on a shaft, said method comprising compounding powdered polytetrafluoroethylene with pore forming vaporizable resin material which vaporizes at a temperature below the sintering temperature of polytetrafluoroethylene, preforming said compounded materials under pressure into annular member shape, heating said member to sintering temperature during which heating said vaporizable resin material is removed from said member resulting in the formation of pores therein, placing said member in cooled condition in a vapor stream of vaporized metallic material maintained under vacuum conditions, the vaporized metallic material condensing on said member to cover and impregnate said member, removing the metallic covering on the bearing surface portion of said member, and smoothing and sizing the metallic covering on the remaining surface portions of said member.

16. The method of forming a polytetrafluoroethylene element impregnated with metallic material for mounting on a shaft, said method comprising forming a relatively porous annular polytetrafluoroethylene member, surrounding said member with molten metallic material under material impregnating pressure conditions, cooling said member, and removing the metallic material covering on the bearing surface of said member.

17. The method of forming a polytetrafluoroethylene element impregnated with metallic material for mounting on a shaft, said method comprising compounding powdered polytetrafluoroethylene with pore forming vaporizable resin material which vaporizes at a temperature below the sintering temperature of polytetrafluoroethylene, preforming said compounded materials under pressure into annular member shape, heating said member to sintering temperature during which heating said vaporizable resin material is removed from said member resulting in the formation of pores therein, surrounding said member with molten metallic material under material impregnating pressure conditions, cooling said member, removing the metallic covering on the bearing surface portion of said member, and smoothing and sizing the metallic covering on the remaining surface portions of said member.

18. The method of forming a polytetrafluoroethylene element impregnated with metallic material for mounting on a shaft, said method comprising forming a relatively porous tube of sintered polytetrafluoroethylene, flowing molten metallic material through the interior of said tube under adequate pressure to force said metallic material through said tube to completely impregnate and cover the same, and sub-dividing said tube into a plurality of metal impregnated elements.

19. The method of forming a polytetrafluoroethylene element impregnated with metallic material for mounting on a shaft, said method comprising forming a relatively porous tube of sintered polytetrafluoroethylene, placing said tube under vacuum, flowing molten metallic material through the interior of said tube resulting in the drawing of said metallic material through said tube to completely impregnate and cover the same, and sub-dividing said tube into a plurality of metal impregnated elements.

References Cited in the file of this patent

UNITED STATES PATENTS

| | | |
|---|---|---|
| 2,456,262 | Fields | Dec. 14, 1948 |
| 2,622,949 | Cotchett | Dec. 13, 1952 |
| 2,691,814 | Tait | Oct. 19, 1954 |
| 2,702,730 | Ivanoff | Feb. 22, 1955 |
| 2,781,552 | Gray | Feb. 19, 1957 |
| 2,815,253 | Spriggs | Dec. 3, 1957 |
| 2,865,692 | Grossmann | Dec. 23, 1958 |

FOREIGN PATENTS

| | | |
|---|---|---|
| 561,165 | Great Britain | May 8, 1944 |